Aug. 17, 1965   D. C. BRADFORD ETAL   3,201,720
SLOW WAVE FILTER HELIX STRUCTURE
Filed Feb. 11, 1960
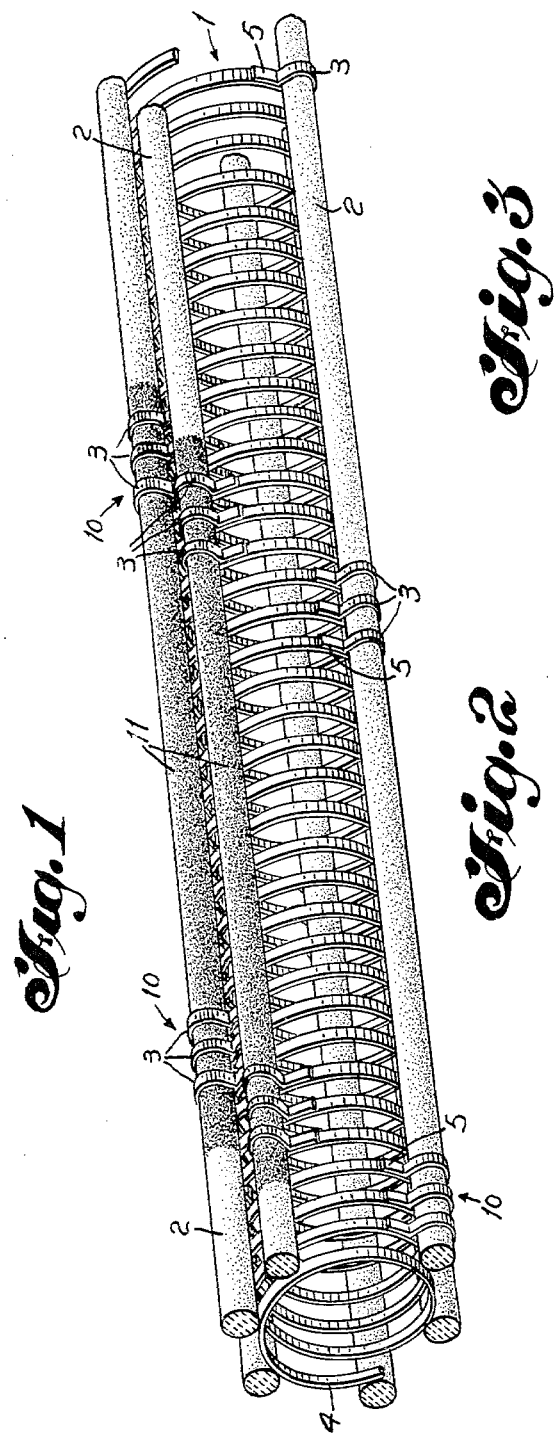
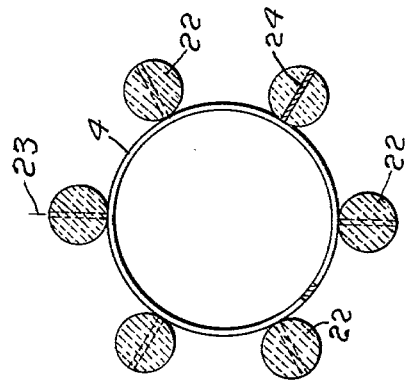
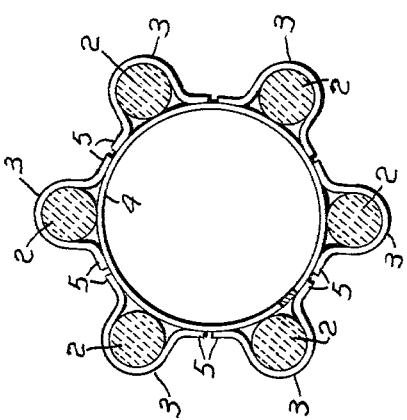
INVENTORS.
DEAN BRADFORD
LOUIS KRZYCH
BY
Charles Baraff
AGENT 3,201,720
SLOW WAVE FILTER HELIX STRUCTURE
Dean C. Bradford, Butler, and Louis J. Krzych, Garfield, N.J., assignors to International Telephone and Telegraph Corporation, Nutley, N.J., a corporation of Maryland
Filed Feb. 11, 1960, Ser. No. 8,032
10 Claims. (Cl. 333—31)

This invention relates to helical slow wave propagating structures and more particularly to such structures as used in traveling wave tubes.

When traveling wave tubes utilizing metallic helices as slow-wave propagation structures are utilized for high power transmission of high frequency waves it is found that rugged assemblies for rigidly supporting the helix are essential to maintain the helix in proper interacting relationship with the electron beam, to prevent microphonics, etc. Concomitantly with a rigid helix supporting assembly, it is often necessary to provide that the broadband slow wave propagating structure will also have filtering or other desired frequency characteristics.

Accordingly, an object of the invention is to provide an improved rigid helix and support assembly therefor, having predetermined filter characteristics.

Another object is to reduce the microphonic noise inherent in a supported helix used as a slow wave propagation element in traveling wave tubes and the like.

A feature of the invention is a filter helix which is supported by insulating rods and fasteners, periodically spaced along the rods, preferably in a pattern related to the pitch, to provide desired filter characteristics.

The above-mentioned and other features and objects of this invention will become more apparent by reference to the following description taken in conjunction with the accompanying drawings, in which:

FIG. 1 is a prespective view of a filter helix structure for a traveling wave tube in accordance with the invention;

FIG. 2 is a cross-sectional view of the supporting rods and clamps for fastening the helix to said rods; and FIG. 3 is a modification showing periodically spaced supporting pins for fastening the rods and helix into a unitary assembly.

Support assemblies for the slow wave helix of traveling wave tubes are known for example, as disclosed in U.S. Patent No. 2,812,499 issued November 5, 1957, to G. H. Robertson or U.S. Patent No. 2,790,926 issued April 30, 1957, to J. A. Morton to which reference is made for examples of prior art traveling wave tubes using slow wave helical structures. A series of cylindrical support rods of any suitable insulation material are used to position the helix in a glass or metal envelope of the traveling wave tube in proper interacting relationship with the electron beam therein.

Referring to FIG. 1, there is shown a preferred embodiment of the invention, including a rugged assembly of a filter helix 1 and ceramic supporting rods 2, held together by sheet metal clamp fasteners 3. The clamps 3 also provide electromagnetic loading reactances periodically arranged and regularly spaced along the main helix transmission line 4.

The filter characteristics of loaded helices are disclosed in an article by W. J. Dodds, and R. W. Peter, entitled "Filter-Helix Traveling Wave Tubes" published in R.C.A. Review, December 1953, pp. 502–532.

The presence of selective discontinuities in the form of periodically spaced sheet metal clamps 3, tends to alter the pass-band characteristics of the propagating modes on the main helix 4 and to change the relative amplitudes of the space harmonic components. In a typical experimental tube, the amplitude of an undesirable space-harmonic component was materially reduced.

The filter helix 1 is arranged to suppress spurious responses such as backward wave oscillations or other undesired modes where these modes can be resolved into an infinite number of space harmonic modes $E_n(r)$, each moving with a different propagation constant $\beta_n$, where $$\beta n = \frac{\theta + 2\pi n}{l_0} \quad n = 0, \pm 1, \pm 2, \pm 3$$

and where $l0$ in the axial physical length of one filter unit and $\theta$ is the electrical uhase angle for the fundamental mode.

The total field, therefore, can be expressed as $$E(r_1 z, t) = \Sigma_n E_n(r) e^{-j\beta nz} e^{j\omega t}$$

This field is built up by energy W stored in the periodic lump reactances 3, and by energy $W_h$ stored in the helical line 4. The contribution of energies W and $W_h$ to the field of the interacting mode may vary depending upon the location of the interacting electron beam within the field of the filter helix 1.

The rugged helix assemblies as shown in FIG. 1, consist of six cylindrical ceramic rods 2 circumferentially spaced about the outside of the helix 4 and supporting the helix 4 peripherally and providing a slow wave structure for traveling wave tubes. The helix 4 is supported rigidly in the traveling wave tube by six supporting rods preferably of a ceramic material having the same coefficient of expansion as the helix 4, which may be of molybdenum or the like. The sheet metal clamps 3 contact the ceramic rods 2 circumferentially and have tabs 5 brazed or welded to the helix 4. The sheet metal clamps 3 are substantially semi-circular in shape and have terminal tabs 5 for fastening to the main helix 4 as illustrated in FIG. 2.

The six longitudinal supporting rods 2 are parallel and contact the helix transmission line 4 tangentially at the points shown.

The sheet metal clamps are arranged in successive triad groups 10, periodically spaced along the helix 4 in a helical pattern pitched oppositely to that of the main helix 4 itself, as illustrated in FIG. 1. Although triad groupings of the clamps 3 are shown, the number of clamps in a pattern group and their spacings is not critical being dependent primarily on the nature of the filter characteristics desired.

Various insulating materials preferably of low dielectric loss may be utilized for the ceramic rods 2, such as zirconium oxide, steatite and the like. Various suitable materials, such as tantalum, tungsten, molybdenum and the like may be used for the helix transmission line 4 in a traveling wave tube.

Lossy material, such as aquadag 11 may be coated over the central portion of the ceramic rods 2 to attenuate reflected waves.

Referring to FIG. 3, which is a modification of the filter helix shown in FIG. 1, the ceramic rods 22 are rigidly fastened to the helix 4 by pins 23, fitted into drill holes 24, whose interior surfaces are metallized. The pins 23 make contact with the helix 4 and are brazed by sutiable brazing material in the drill holes 24, whereby they also provide a filter characteristic by electromagnetically loading the helix 4.

While we have described above the principles of our invention in connection with specific apparatus, it is to be clearly understood that this description is made by way of example only, and not as a limitation on the scope of our invention as set forth in the objects thereof and in the accompanying claims.

We claim:
1. A slow wave filter helix structure for a traveling wave tube comprising a metallic helix forming a transmission line for electromagnetic waves, parallel insulating support rods contacting said helix longitudinally, and a plurality of electrical loading elements in the form of metal fasteners each rigidly affixing only one of said rods to said helix and forming an integral structure and direct electrical connection therewith, said elements being arranged on each rod in groups periodically spaced along said helix to establish selective pass-band characteristics of space harmonic components in the propagation of said waves through said tube.

2. The filter helix of claim 1, wherein said periodically spaced loading elements are metal, strap-like clamps arranged in regular groups about said rods, each clamp having metal terminal tabs at each end fastened to the helix and a central portion thereof surrounding a rod.

3. The filter helix of claim 2, wherein pairs of clamp groups are spaced longitudinally on each of the rods.

4. A slow wave filter helix structure for a travelling wave tube comprising a metallic helix forming a transmission line for electromagnetic waves, parallel insulating support rods contacting said helix longitudinally, and a plurality of electrical loading elements in the form of metal fasteners each rigidly affixing only one of said rods to said helix and forming an integral structure and direct electrical connection therewith, said elements being arranged on each rod in groups periodically spaced along said helix to establish selective pass-band characteristics of space harmonic components in the propagation of said waves through said tube, each element being in the form of a strap-like clamp having terminal tabs at each end fastened to the helix and a central portion thereof surrounding a rod, pairs of said clamp groups being spaced longitudinally on each said rod and the clamp groups of each separate rod being spaced both longitudinally and circumferentially with respect to the groups on each other rod.

5. The filter helix of claim 4, wherein said loading clamps are arranged in a helical pattern whose pitch is different from the pitch of said helix line.

6. The filter helix of claim 1, wherein said periodically spaced loading elements are fastening pins rigidly connecting the insulating rods and helix, the pins on each rod being spaced longitudinally and circumferentially with respect to the pins on each other rod, said pins loading said helix electromagnetically to provide wave filter characteristics.

7. The filter helix of claim 1 wherein said periodically spaced fasteners are arranged in regular groups on each rod, the groups of each rod being spaced both longitudinally and circumferentially with respect to the groups on each other rod.

8. The filter helix of claim 7 wherein said groups of fasteners are arranged in a helical pattern whose pitch is different from the pitch of said helix line.

9. The filter helix of claim 7 wherein said periodically spaced fasteners are in the form of pins through said rods.

10. A slow wave filter helix structure for a traveling wave tube comprising a metallic helix forming a transmission line for electromagnetic waves, parallel insulating support rods contacting said helix longitudinally, and a plurality of electrical loading elements in the form of metal fasteners each rigidly affixing one of said rods to said helix and forming an integral structure and direct electrical connection therewith, said elements being arranged on each rod in groups periodically spaced along said helix to establish selective pass-band characteristics of space harmonic components in the propagation of said waves through said tube, the groups of each rod being spaced both longitudinally and circumferentially with respect to the groups on each other rod.

References Cited by the Examiner

UNITED STATES PATENTS

| | | | |
|---|---|---|---|
| 2,806,170 | 9/57 | Bianculli | 333—31 X |
| 2,808,533 | 10/57 | Robertson | 3333—31 |
| 2,828,440 | 3/58 | Dodds et al. | 333—31 X |
| 2,894,168 | 7/59 | Wing et al. | 333—31 X |
| 2,903,657 | 9/59 | Eichlin | 333—31 |
| 2,922,067 | 1/60 | Van Dien | 333—31 |
| 2,940,006 | 6/60 | Cuccia | 315—3.5 X |

HERMAN KARL SAALBACH, *Primary Examiner.*

ELI J. SAX, *Examiner.*